United States Patent [19]
Lehman

[11] 3,857,685
[45] Dec. 31, 1974

[54] SYNTHETIC NATURAL GAS PRODUCTION USING A PLUG-FLOW REACTOR

[75] Inventor: Leon M. Lehman, Brooklyn, N.Y.

[73] Assignee: Hydrocarbon Research, Inc., New York, N.Y.

[22] Filed: Dec. 20, 1972

[21] Appl. No.: 317,037

[52] U.S. Cl. .................................................. 48/213
[51] Int. Cl. .......................... C01b 2/14, C10g 13/30
[58] Field of Search .............. 48/211, 213, 196, 197

[56] References Cited
UNITED STATES PATENTS

| | | | |
|---|---|---|---|
| 3,047,371 | 7/1962 | Krause et al. | 48/211 X |
| 3,202,603 | 8/1965 | Keith et al. | 48/213 X |
| 3,414,247 | 12/1968 | Sama | 48/196 |
| 3,484,219 | 12/1969 | Dent et al. | 48/213 X |
| 3,537,977 | 11/1970 | Smith, Jr. | 48/213 UX |
| 3,551,124 | 12/1970 | Iwaki et al. | 48/213 X |
| 3,732,085 | 5/1973 | Carr et al. | 48/213 X |

Primary Examiner—R. E. Serwin

[57] ABSTRACT

A multi-zone-plug-flow-reactor is used to produce synthetic natural gas (SNG) by thermal hydrocracking. A vaporized hydrocarbon feed and a portion of the required hydrogen is fed downwardly through the reactor initially at 800° to 1,200°F and above 200 psig. The partially thermally hydrocracked hydrocarbon feed is stepwise quenched to maintain a temperature differential of 150°F maximum between each zone and the remainder of the hydrogen is mixed with the feed at various points within the reactor to complete the hydrocracking in the last zone and thereby provide a product which is quenched to a temperature at which no further hydrocracking will occur. The reactor product is cryogenically separated to provide recycle hydrogen, gas for hydrogen generation and the SNG product.

8 Claims, 1 Drawing Figure

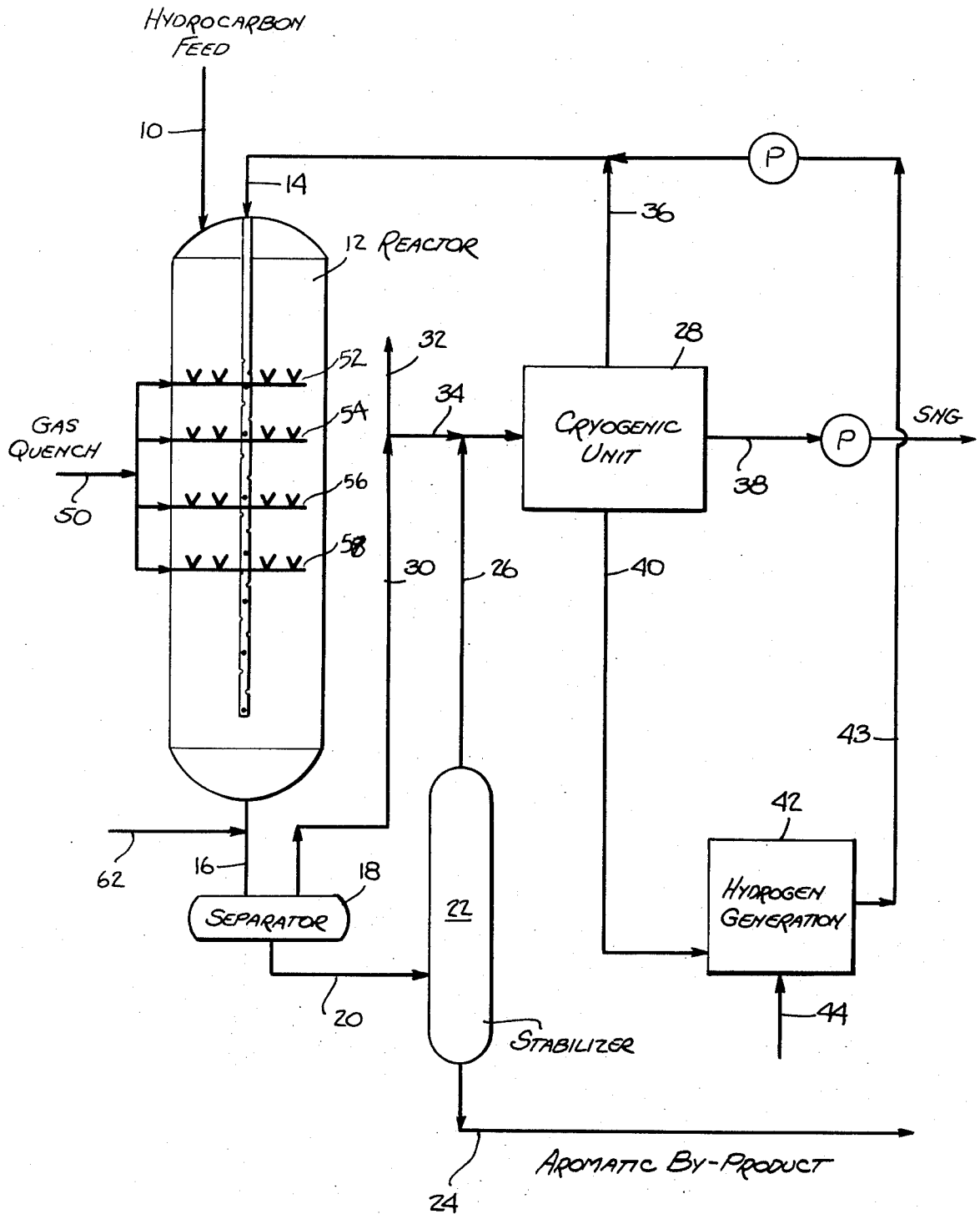

SYNTHETIC NATURAL GAS PRODUCTION USING A PLUG-FLOW REACTOR

BACKGROUND OF THE INVENTION

The present invention relates to a process for the manufacture, under pressure, of synthetic natural gas (SNG) from liquid and gaseous hydrocarbons such as crude oil, light distillates, and preferably propane, and heavier hydrocarbons.

Previous processes for SNG production have been proposed in which there is first carried out, in the reactor, a thermal cracking, under pressure, of the petroleum hydrocarbons on a contact mass having weak catalytic activity. From this one obtains a basic gas containing a large percentage of methane of which the content of unsaturated hydrocarbons is substantially equal to that in hydrogen. The basic gas is thereafter subjected to an auto-hydrogenation in the presence of a catalytic mass including a metal preferably from the platinum family.

The thermal hydrocracking processes are highly exothermic and, unless carefully controlled, can cause the operation of the reactors both to be hazardous and to lead to undesirable side reactions depositing coke and eventually plugging the equipment. It should be noted that the reaction of a virgin petroleum fraction boiling in the range of 380° to 480°F, with the necessary quantity of hydrogen, can result in calculated temperature rises well in excess of 1,000°F. Consequently quenches are required throughout the reactor. However, in view of the order of magnitude of the temperature rise involved here the rise would become excessive unless it were known precisely where to place the quenches. This placement of quenches is not easily resolved when a natural material, such as a petroleum distillate containing a wide variety of organic compounds, is being hydrocracked. This is further complicated as a commercial reactor generally must handle feedstocks that may vary widely in composition over a given period of time.

A further hazard results from the necessity of heating the feedstock to the desired temperature. The reaction could proceed uncontrollably in the equipment first used to heat the feedstock and hydrogen mixture to the temperature needed to initiate reaction.

One solution to this problem is to use a back-mixed reactor for this system. In such a reactor there ideally is no temperature gradient as the material within the reactor is of uniform composition and temperature. There are several means of achieving a back-mixed reactor which means are wellknown to those versed in the art. These include the use of a fluidized bed of solid material as well as back-mixing by purely hydrodynamic means. While the back-mixed reactor is a satisfactory manner of solving the problem of temperature control, it has several disadvantages when compared to a plug-flow reactor. To achieve a given conversion at a fixed temperature requires a larger back-mixed reactor than plugflow reactor. This increased severity can lead to problems in the formation of unwanted by-products including coke.

This process consists of a specific plug-flow reactor design for the thermal hydrocracking of the propane and heavier hydrocarbons. An important application of this reactor design is in processes for the production of substitute natural gas (SNG) by the hydrocracking of either normally gaseous hydrocarbons, propane and butane, or normally liquid streams containing primarily hydrocarbons including naphtha, light distillates and gas oils.

SUMMARY OF THE INVENTION

In the production of SNG by hydrocracking, it is particularly desirable that all the saturated compounds in the feed, paraffins and naphthenes, be converted to ethane and methane. Of course, it would be ideal if little or no ethane is produced, but the severity necessary to hydrocrack ethane to methane is generally considered excessive. If the feedstock contains aromatic hydrocarbons, the aromatic ring is generally stable though considerable hydrodealkylation can take place. In a properly designed plug-flow reactor thermal hydrocracking process for the production of SNG, the reactor effluent will consist of unconverted hydrogen, methane, ethane and aromatics. The aromatics are readily separable from the other gases and can be fractionated into high purity chemicals. The ethane and unconverted hydrogen can be separated from the desired SNG product, which is the methane constituent, by cryogenic means in a simple fashion and without the need for external refrigeration. The production of high purity aromatics requires the use of the plug-flow rather than backmixed reactor in a thermal hydrocracking process. In such a process, a single pass produces a reactor effluent that is essentially free of $C_3$ plus non-aromatic compounds.

This invention consists of a thermal hydrocracking process which uses a plug-flow type of reactor for the thermal hydrocracking of hydrocarbons boiling in the general range of 200 to 900°F. While the plug-flow reactor principle can be used for lower boiling hydrocarbons, it is particularly advantageous with the higher boiling compounds as well as petroleum distillates containing a wide range of compounds.

The process comprises the mixing of the feed to be hydrocracked with only a small portion, less than half, of the hydrogen needed for the specific hydrocracking operation. The quantity of hydrogen added can be calculated so that an excessive temperature rise cannot occur since hydrogen is required for the exotherm. The remainder of the hydrogen gas is added at ambient temperature in a continuous manner, either throughout the length of the reactor, or through any portion of the length. One way of doing this is through a pipe in the center of the reactor in which holes are drilled in some pre-calculated fashion. In addition, to permit direct control of any specific operation, provision is made for conventional quench points along the reactor. These conventional quenches can feed a portion of the required hydrogen, an inert material such as steam or nitrogen, or a recycle gas derived from the reactor effluent after cooling to ambient conditions.

The feed and hydrogen are fed, preferably as a vaporized mixture, at a temperature between 800° and 1,200°F, preferably 900° to 1,000°F, to the upper portion of the reactor. The reactor is of the plug-flow type operated at above 200 psig and preferably between 200 and 2,000 psig. The mixture is thermally hydrocracked in the first portion of the reactor, and the operating conditions, which are dependent upon the boiling range of the feed, are controlled so as to allow the temperature during the thermal hydrocracking to only rise a maximum of 150°F after which the reaction temperature is quenched.

The remainder of the hydrogen required to complete the thermal hydrocracking is injected into the reactants throughout the remainder of the reaction zone. Additional quenching means are provided throughout the reactor to maintain the temperature rise between quenches at less than 150°F. The residence time in the reactor would be between 5 and 300 seconds but preferably between 5 and 50 seconds.

The effluent resulting from the completed thermal hydrocracking reaction is taken from the reactor and undergoes a quench to prevent further cracking.

The quenched effluent then undergoes separation processes whereby one removes aromatics and cryogenically recovers a hydrogen recycle, an ethane-rich stream for hydrogen generation and a methane-rich stream having a heating value between 800 and 1,000 BTU's, which is the desired SNG product.

DESCRIPTION OF THE DRAWING

The drawing shows a preferred arrangement of process equipment for the production of SNG from a hydrocarbon feed boiling between 200° and 900°F wherein the thermal hydrocracking reactor is periodically quenched throughout its length and wherein hydrogen is added through the length of the reactor.

DESCRIPTION OF THE PREFERRED EMBODIMENT

A 200° to 900°F preferably a kerosene boiling range feed is fed by line 10 to reactor 12 at between 900° and 1,000°F. Reactor 12 is operated at a pressure that will produce the SNG product at the pressure desired preferably 200 to 2,000 psig and the reactor 12 is a plug-flow reactor. The thermal hydrocracking of a kerosene boiling range feed requires 15moles of hydrogen per mole of kerosene. The feed in 10 carries 4 moles of hydrogen per mole of kerosene boiling range feed. As the feed mixture enters the top of reactor 12 the thermal hydrocracking reaction is initiated. The partially hydrocracked feed mixture is then quenched at 52 by quench gas 50, as hereinbefore defined. Center pipe 14 carries ambient hydrogen providing the remaining 11 moles of hydrogen per mole of feed. This pipe has a great number of holes in it which holes are distributed over the length of the hydrocracking zones. Additional quench points 54, 56 and 58 are provided to allow a positive center of the reactor temperature patterns so that the temperature between quenches is not allowed to increase over 150°F. The total effluent leaves reactor 12 in 16 and is quenched by 62 to inhibit further hydrocracking. The residence time is about 25 seconds.

The effluent 16 is flashed in separator 18 providing essentially unconverted liquid aromatics in 20. This liquid in 20 is fed to the stabilizer 22 and an aromatic by-product is removed at 24. The vapor 26 joins with the material in 34 to go into cryogenic unit 28. The light overhead stream from 18 in 30 may be recycled in part at 32 to 50 for quench to the reactor 12 with the major portion passing in 34 to 28. The effluent in 34 is then cryogenically separated in 28 into a hydrogen stream in 36 for recycle in 14 and an ethane-rich stream in 40, which is passed to 42 for hydrogen generation by a process such as steam reforming, wherein steam in 44 is fed to 42. The resulting hydrogen in 43 is combined with 36 for recycle to reactor 12 in 14. The cryogenic unit 28 also produces the methane rich stream 38, which has a heating valve of 800 to 1,000 BTU's for use as SNG.

As can be seen from the foregoing, the amount of hydrogen fed with the feed as well as the addition of the remainder of the hydrogen and placement of the quench would be determined from the boiling range of the feed and the exothermic nature of the thermal hydrocracking. In this process the great advantage lies in that no further methanation step is required while the reactor temperature is controlled to limit unwanted by-products.

Numerous modifications now apparent to those skilled in the art may be made without departing from the basic concepts of the present invention.

I claim:

1. A process for the production of synthetic natural gas having a heating value between 800 and 1,000 BTU's from a hydrocarbon distillate which boils between 200° and 900°F which comprises:
   a. combining said distillate with less than 50 percent of the hydrogen required for the hydrocracking of the distillate;
   b. feeding said distillate-hydrogen mixture as a vapor to the upper portion of a reaction zone at 800° to 1,200°F;
   c. thermally hydrocracking said mixture in the upper portion of said reaction zone;
   d. quenching said mixture to maintain temperature control with a quench selected from the group consisting of hydrogen, steam, nitrogen and recycle gas derived from the reaction zone effluent;
   e. feeding the remainder of the hydrogen required to the reaction zone so as to be distributed throughout the remaining portion of the reaction zone to complete the thermal hydrocracking of said distillate;
   f. removing the hydrocracked product;
   g. quenching said product to prevent further hydrocracking;
   h. passing said quenched product to a separator; and
   i. recovering a synthetic natural gas product therefrom.

2. The process of claim 1 wherein the reactor is a multiple-zone-plug-flow reactor.

3. The process of claim 1 wherein there are at least two quench zones in said reaction zone.

4. The process of claim 1 wherein the temperature differential between quench zones is less than 150°F.

5. The process of claim 1 wherein said remainder of the hydrogen is fed to the reaction zone at ambient temperature.

6. The process of claim 1 wherein the quenched product is first separated into a liquid aromatics stream and a vapor stream and wherein said vapor is cryogenically separated to yield a hydrogen-rich stream, an ethane-rich stream and a synthetic natural gas stream.

7. The process of claim 6 wherein said ethane-rich stream is used to generate hydrogen.

8. The process of claim 1 wherein said mixture in (b) is fed at a temperature between 900° and 1,000°F.

* * * * *